June 6, 1944.  G. DUTTWEILER  2,350,883
METHOD FOR THE STORAGE OF GOODS
Filed March 26, 1940  3 Sheets-Sheet 1
Fig. 1.
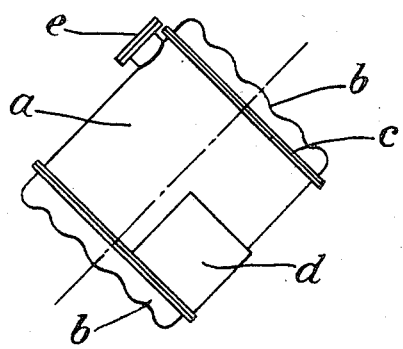
Fig. 2.
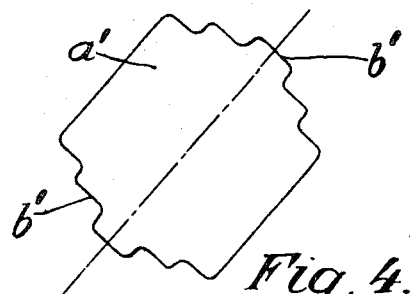
Fig. 3.
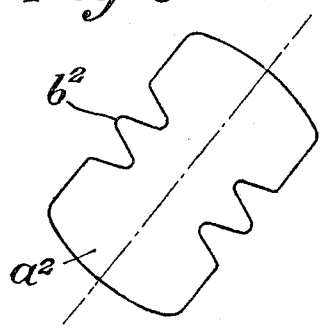
Fig. 4.
Fig. 5.
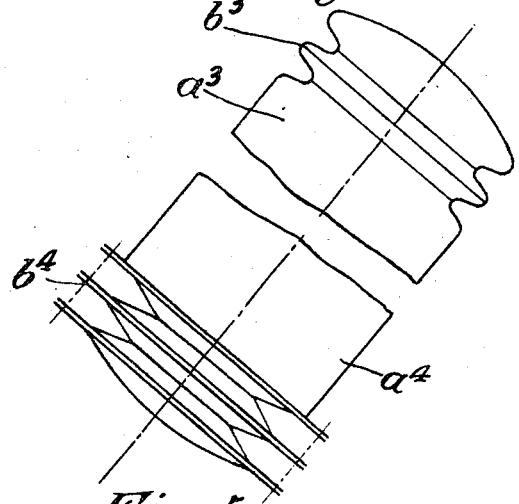
Fig. 6
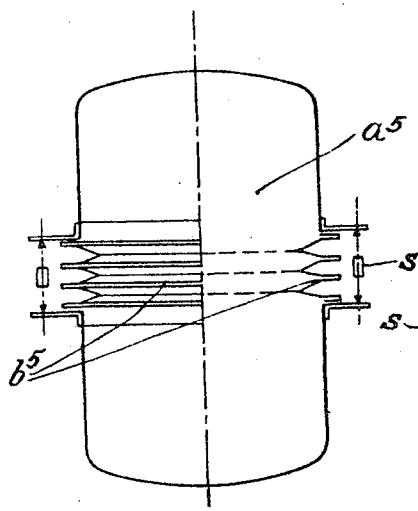
Fig. 7.
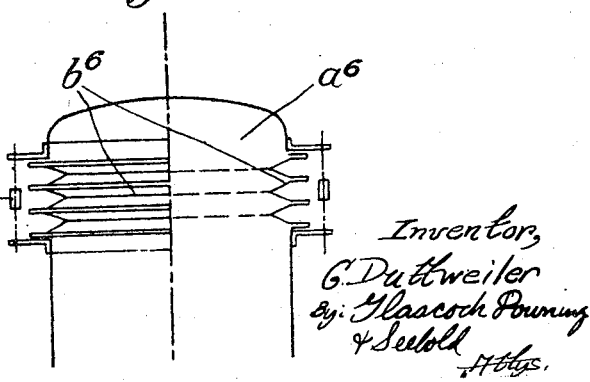
Inventor,
G. Duttweiler
By: Glascock Downing
& Seebold
Attys.

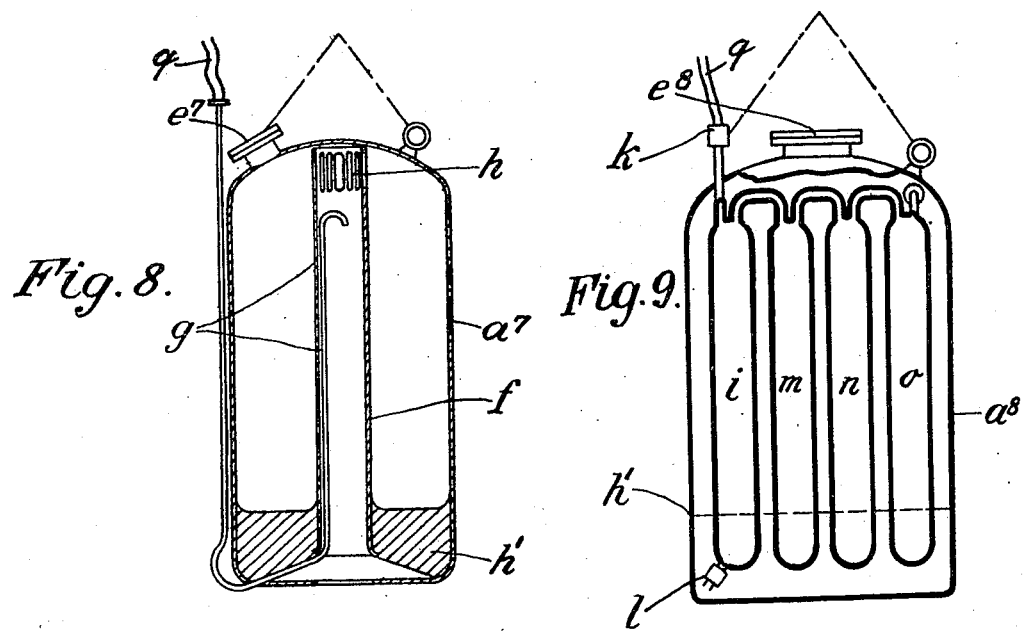
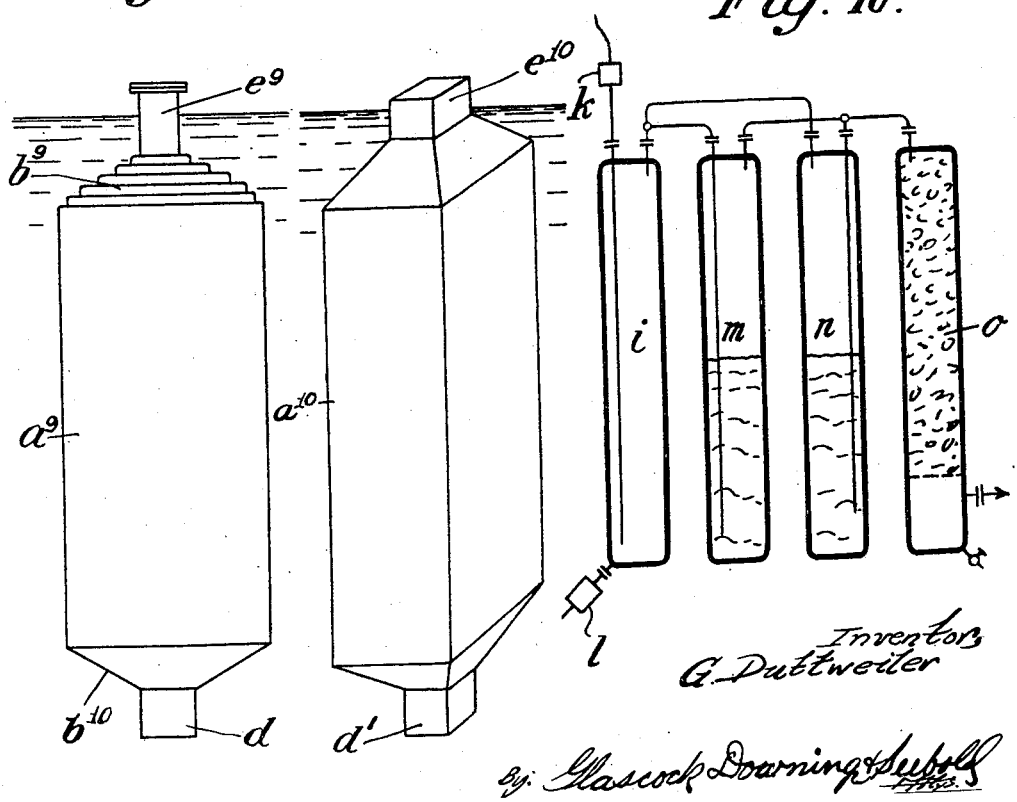

Patented June 6, 1944

2,350,883

UNITED STATES PATENT OFFICE 2,350,883

METHOD FOR THE STORAGE OF GOODS

Gottlieb Duttweiler, Ruschlikon, Switzerland

Application March 26, 1940, Serial No. 326,114
In Switzerland April 17, 1939

4 Claims. (Cl. 62—170)

The present invention relates to a method for storing materials such as grain, fruits, vegetables, meat, oil, benzole and the like.

Heretofore the storage of grain, fruits, vegetables, meat, oil, benzole and the like has been effected ordinarily in special overground storehouses, silos and the like and seldom only in under-ground storage-reservoirs arranged for instance in the earth ground or in rocks.

Overground reservoirs need however a relatively large space which could be more economically utilized in another manner; they are relatively expensive in construction and maintenance and the stored materials are exposed to the eventually great differences in the temperature of the outside air. Materials such as grain and the like need therefore a permanent attendance and working up. A further disadvantage of the storage houses, silos and the like is based upon the fact that in case of war they are with their content, exposed to the attack of projectiles and aeroplane bombs.

The present invention has for its object to remove thes disadvantages and according to the method forming a part of this invention this is effected by inserting the materials to be stored into containers or tanks which may have for instance a size of at least the capacity of 10 tons and which, after they have been filled up, are at least partly sunk into natural waters such as rivers, lakes and the like. This sinking of the tanks allows to reduce the heat transition between the medium outside the tank and the material stored, which is preferably filled in a cooled condition, as the difference between the temperatures within and outside the tank is reduced. In carrying out this method at least one tank is provided for receiving the material to be stored, which tank is constructed in such a manner that it can be located at least in a partially sunk position in natural waters.

The method can be performed in such a manner that the material to be stored can be dried and cooled and in this condition inserted into the tanks, whereupon, when grain or similar materials are being inserted they may be firmly compacted in the tank during filling by vibrating devices. Cooling of the material can therefore be effected before the filling of the tank within or outside the tank, for instance, by means of dry-ice. Preferably the storage of the material occurs during cool dry weather, for instance, in winter. When material is stored in bulk form an inert gas may be inserted into the tank which gas, together with the bulked material, takes up an eventual outer pressure when the closed tank is sunk into the water.

The container or tank preferably is constructed in such a manner that its shape may be altered under the action of the water-pressure weighing on it, so that this pressure is taken up by the storage material. To this end the thickness and the disposition of the walls and the material from which these tanks are made can be chosen so that the changing of the shape is possible without further, or special means being provided on the tanks which enable an elastic altering of the shape of at least a portion of the tanks. For this reason the tanks do not have to be built so strong as to stand the outer water pressure but this pressure is transmitted over the walls adapted to be elastically altered in shape to the stored material in such a manner that the stored material takes up this pressure and compensates the same.

Comparative calculations have shown already that from a capacity of about 10 tons the proposed storage-system for instance for grain is economically superior to the usual storage in overground buildings. The containers or tanks can be directly connected with cooling appliances whereupon the efficiency of these cooling appliances can be chosen relatively small especially when the tanks are brought to such a water depth where there is a temperature substantially constant at 39°–41° F. so that an eventually necessary further cooling has to be effected only from these 39°–41° F. downwards.

For lowering and raising the tanks into and out of the water, especial devices can be provided as well as such for the filling and emptying of the tanks.

According to the material stored a sinking of the tanks is sufficient to such a depth that a socket like neck portion of the tank extends above the water level after the tank has been filled. Preferably the tanks are made with a circular or rectangular cross-section whereupon the dimensions and disposition of the side-walls permit an elastic deflection (vaulting) for compensating the outer water-pressure. When the longitudinal axis is vertically arranged the two end-walls of the tank may be conically tapered whereby a complete filling and emptying of the tank with granulous material such as grain for instance may be accomplished in a simple manner and without the danger of the formation of empty spaces.

To prevent the occurence of a greater damage, namely, water entering into the stored material, if the containers are damaged, special safety-devices may be provided with optical, acoustical or other signal devices with automatic raising means which lift the damaged tank out of the water.

Trials have shown that with tanks already submerged in water, in spite of the incompressibility of the water, the effect of projectiles (airplane bombs) exploding in the water at a distance of about 10 to 100 metres, according to the kind of the material stored, disappears. Sinking of the tanks in depths of such kind, that at the greatest density of water where the constant temperature 39° F. prevails gives thus already a protection against bombs dropped into the water. The tanks are preferably made of iron but an elastic material of non-metallic nature may also be utilized, as for instance a waterproof weaving with gum cover, net-works with water-proof material etc. Of course into tanks of this kind medicaments, explosive substances and other substances may be inserted. To obtain a better isolation and to increase the safety against entering of water the tanks may be constructed with two walls.

Various embodiments of the present invention are shown on the accompanying drawings in which Figs. 1 to 7 show diagrammatic elevational views of seven embodiments of the invention.

Figs. 8, 9 and 10 are vertical sectional views of containers or tanks adapted to receive an inner gas-pressure to compensate at least a portion of the outer water-pressure.

Figs. 12 and 13 are perspective views showing respectively a cylindrical and a prismatical tank each with its axis vertically disposed.

Figure 11:
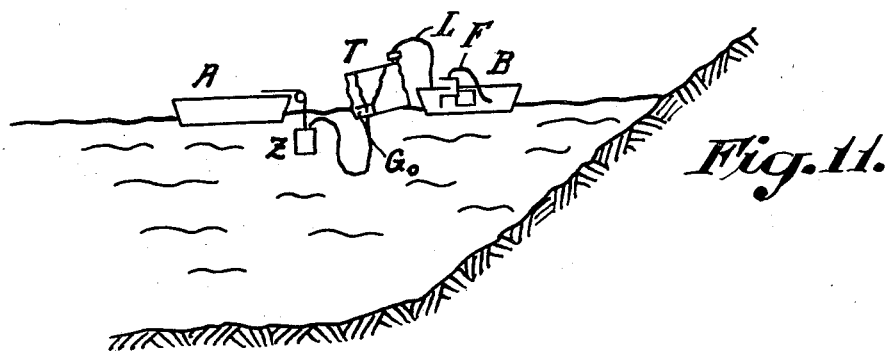
Figs. 11, 11a, 11b and 11c are elevational views showing the example of an arrangement for sinking a tank and for adjusting its floating position.
Figure 11A:
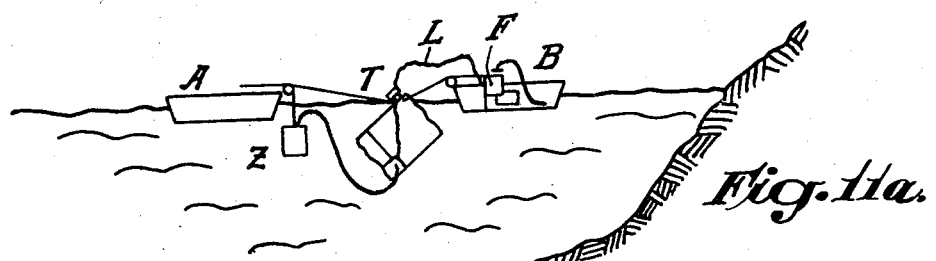
Figure 11B:
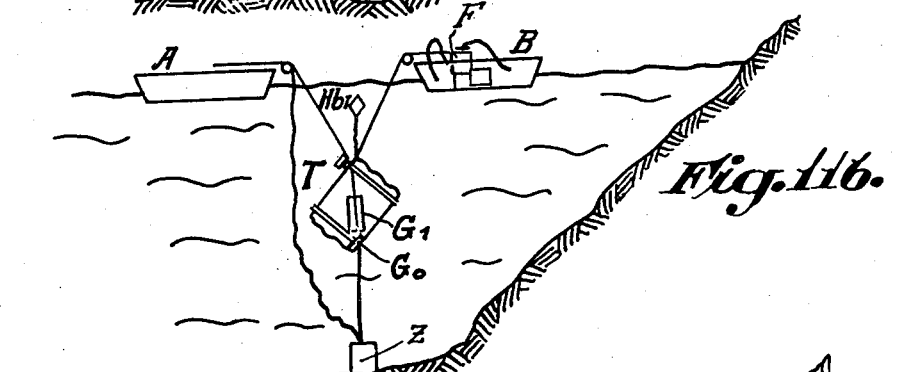
Figure 11C:
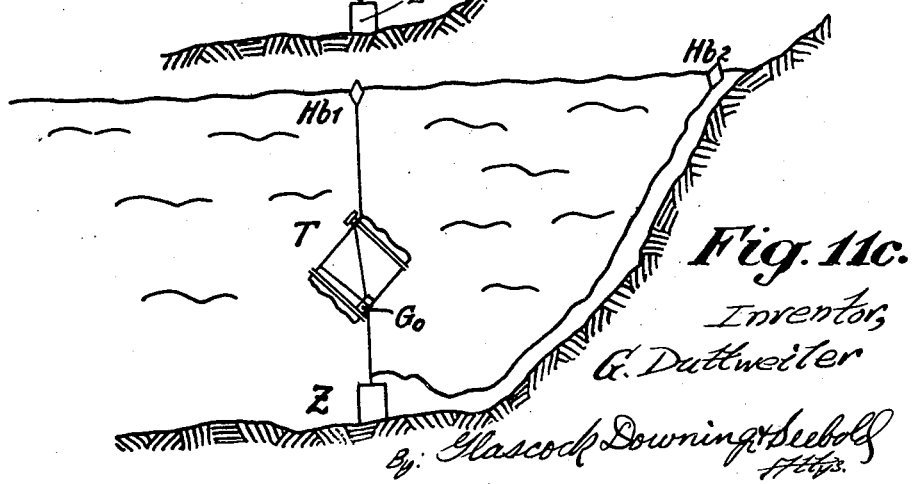

On the tanks $a$ and $a^1$ respectively shown in Figs. 1 and 2 the diameter and the length are about equal one to another while the tanks $a^2$, $a^3$ and $a^4$ according to Figs. 3, 4 and 5 respectively, have an elongated form. All these tanks have corresponding parts $b$, $b^1$, $b^2$, $b^3$ and $b^4$, respectively, which can elastically be altered in shape. According to Fig. 1 this part $b$ consists of corrugated elastic plates and according to Fig. 2 the end plates $b^1$ form steps and are thus again made elastic and adapted to alter their shape. In the modifications represented by Figs. 3 and 4 the parts $b^2$ and $b^3$ are made in the form of a spring-tube which, according to Fig. 3 is located in the middle of the length of the tank $a^2$, while according to Fig. 4 such spring-tube $b^3$ is provided on each extremity of the tank $a^3$ (only one of these extremities being shown on the drawings). According to Fig. 5 the part $b^4$ adapted to be elastically deformed consists of a bellows built up from diaphragm-rings connected one with another. As shown in Fig. 1 the tanks are provided with a filling socket $e$ and with reinforcing rings $c$ to which ballast-weights may be fastened when the tanks are sunk, or ropes, chains or the like can be attached thereon. A ballast-weight $d$ is provided for effecting a stable floating-position of the tank.

On the tanks described herebefore the elastically deformable part is practically tensionless in empty condition and above water. When the filled tank is sunk into water the deformable part is deformed and is subjected to inner tensions which are maintained as long as the tank rests under water. These inner tensions in the material of the deformable part can alter the crystalline structure of the metal whereby the strength of the metal itself may be reduced.

This disadvantage is obviated with the embodiments of the present invention shown in Figs. 6 and 7 by influencing the deforable part $b^5$ in such a manner that it is tensionless in compressed condition under water. To attain this result devices $s$ such as threaded bolts, bent levers are provided on the sides of the bellow $b^5$ formed by the diaphragm rings by which devices $s$ the elastic element of the structure is extended before the tank $a^5$ is filled, that is, when the tank is still at the water-surface. When the tank is filled and closed the devices $s$ are discharged whereby a little contraction according to the effective elastic forces of the part $b^5$ takes place. When the tank $a^5$ is sunk into the water a compression of the tank on the line of the tensionless condition of the part takes place under the action of the outer water-pressure.

According to Fig. 6 the elastically deformable part $b^5$ is disposed in the middle zone of the tank $a^5$. Fig. 7 shows the part $b^6$ at the extremity of the tank $a^6$. Of course also the deformable parts of the examples according to Figs. 1 to 5 can be provided in a similar manner with devices $s$. The modifications shown in Figs. 6 and 7 represent a particular simple solution.

The reduction of the volume of the tanks when they are sunk into the water represents a reduction in buoyancy which at a great compressibility and great capacity of the tanks can reach such an extent that manipulation of the tank is rendered very difficult or even impossible.

This disadvantage can be removed by making the tank rigid so that it has a constant volume and is not compressed when sunk into the water and therefore it does not suffer a reduction in buoyancy. To enable this without the necessity of reinforcing the tank in such a manner as to be able to withstand the outer water-pressure— by which reinforcing the above mentioned advantages of an economical storage might be lost—the outer water-pressure is compensated by the material stored and an inner gas-pressure.

Figs. 8 and 9 show two modifications of tanks of this kind.

Fig. 8 represents an underwater-tank $a^7$ which works on over or equal pressure. Into a tube $f$ there discharges a gas supply-pipe $g$ by way of which from outside the water surface the compensating gas- or air-pressure is produced in the interior of the tank by means of a pressure pipe $q$. $h^1$ is an additional weight used for ensuring the sinking of the tank $a^7$ even if the material stored is particularly light. The lower end of the pipe $f$ is open and in communication with the surrounding water. At its upper end the pipe communicates with the interior of the tank by means of openings $h$, whereby small differences in pressure which may be caused by later dilations or contractions may be compensated. This communication however has in certain cases the great disadvantage that the atmosphere in the interior of the tank $a^7$ can become saturated with moisture.

With the tank $a^8$ according to Fig. 9 this disadvantage is obviated by employing a closed system with little inner overpressure and separated from the outer water. In this modification $i$ represents a recipient of a barometer-pipe with water derivation (safety against eventual leakage-water of the pressure-gas pipe), $k$ a non-return valve against outer over-pressure, $l$ a non-return valve against inner over-pressure, $m$ and $n$ are double-acting pipes for carrying away moisture and $o$ is a drying-turret. Fig. 10 shows the fundamental manner of connecting these parts $k$ to $o$ forming the locking device. The structure of this locking device is exceedingly simple and works without greater mechanical auxiliary devices and results in an increased safety of operation. The tank $a^8$, once sunk, in view of said locking device does not need to be connected with the water surface by a pressure-pipe, but is also not exposed to explosion-danger when rising to the water-surface. Further the interior of the tank can be charged with a dry gas which can be conditioned at pleasure. It will be self-evident that the principle of this locking-device may be employed in connection with underground-storage-tanks of various shape and for various kinds of materials to be stored.

Figs. 11, 11$a$, 11$b$ and 11$c$ illustrate, by way of example, a device for sinking a tank and adjusting it in its floating position. In this figure, A represents a ship with lifting-apparatus, B a ship with lifting-apparatus and devices for supplying grain, T the underwater-tank with firmly attached auxiliary weight for stable floating position, G₀ an auxiliary weight, G₁ an additional weight for sinking the tank until it has been compressed, Z an additional weight for sinking the tank (anchor-weight) H$b_1$ an auxiliary buoy for marking the standing-place of the tank and H$b_2$ an auxiliary buoy for fastening the lifting rope for the additional weight for the re-lifting of the tank.

Figs. 11, 11$a$, 11$b$ and 11$c$, respectively, refer to different phases.

As shown in Fig. 11, the tank T floats on the surface of the water, the ship B is loaded with the goods to be stored, as for instance grain, which is sucked by means of a pneumatic supply device F and deposited into the tank T by means of the hose- or pipe-device L. The additional weight Z hangs on the ship A.

As shown in Fig. 11$a$, the filling in of the grain is nearly accomplished. By the firmly attached weight G a position inclined at about 45° towards the water-surface is given to the tank T. This latter is balanced in such a manner that in filled condition it has only weak buoyancy. The additional weight hangs on the lifting work ship A.

As shown in Fig. 11$b$, the tank T is completely filled and closed. By sinking of the additional weight Z and by attaching of further additional weights G₁ the tank T is sunk until it has been compressed under the influence of the outer water-pressure and has lost in buoyancy. This reduction in buoyancy allows the removing of the weight G so that in the final position, as shown in Fig. 11$c$, the tank T is loaded by the additional weight Z only and, similar to a captive balloon in the air, swims in the water and is held by the additional weight (anchor) Z. An auxiliary buoy H$b_1$ indicates the position of the tank. The two lifting-apparatus ships A and B have travelled to the shore while the ship A has taken with it the auxiliary buoy H$b_2$ with the lifting rope where this buoy can be anchored above or below the water.

With this arrangement and especially by the possibility of employing small thickness for the wall of the tank it becomes possible to reduce the storage costs for the unit of storage-volume to a fraction of the costs of the storage in underground earth or rock storage containers.

According to Fig. 12 the tank $a^9$ has an elongated cylindrical shape. The upper and the lower closing-walls $b^9$ and $b^{10}$ are of conical form while the upper one of these walls $b^9$ is made in a plurality of ring-shaped steps whereby an elastic deformation of this part is possible. The tank is provided with a loading weight $d$ and with the usual filling- and emptying-socket $e^9$ which, after filling of the tank, projects beyond the water-surface.

The tank $a^{10}$ shown in Fig. 13 is prismatic and of quadrangular cross-section. The dimensions of the side-walls are such that these walls can deflect with their middle-portion under the influence of the outer water-pressure so that these walls form the elastically deformable parts. As in Fig. 9, the tank $a^{10}$ is provided with an emptying socket $e^{10}$ and a loading weight $d^1$.

The tanks may be made with such dimensions and shape that they can be used directly as transport-containers according to the "container-system." The storage-economy of such small containers is given by sparing of the costs.

Several of such smaller transport-containers can be placed in a common greater tank adapted to be sunk at least partially.

For the storage of vegetables, potatoes and the like in tanks of the kind described these goods, before being stored, may be slightly cooked, dried, pressed and afterwards frozen.

As natural waters in the sense of the present application are to be considered also reservoirs and storage lakes.

What I claim is:

1. A method of storing materials comprising cooling the material to be stored, inserting the cooled material in a container, sealing the container, lowering the sealed container in a body of water, maintaining a pressure within the submerged container substantially equivalent to the outer water pressure to prevent collapsing of the outer walls of the container, and anchoring the sealed container in its submerged position in the water.

2. A method as claimed in claim 1 for storing granular material, including the step of shaking the container during the step of inserting the material into the container.

3. A method as claimed in claim 1 in which the pressure within the container is controlled by the employment of a container having a deformable wall portion.

4. A method as claimed in claim 1 in which an inert gas is inserted within the container at the time the material is inserted to coact with the goods therein to insure maintenance of the pressure within the container substantially equivalent to the outer water pressure when the container is in a submerged position.

GOTTLIEB DUTTWEILER.